United States Patent

Cornelious

[11] Patent Number: 5,810,191
[45] Date of Patent: Sep. 22, 1998

[54] UTILITY BASKET AND BAIT CONTAINER

[76] Inventor: Lucien B. Cornelious, 8701 4th St. N., Apt. 104, St. Petersburg, Fla. 33702

[21] Appl. No.: 916,763

[22] Filed: Aug. 19, 1997

[51] Int. Cl.$^6$ ....................................................... B65D 6/08
[52] U.S. Cl. .............................................. 220/493; 43/100
[58] Field of Search ................................ 220/493; 224/5; 43/100, 9.95, 41

[56] References Cited

U.S. PATENT DOCUMENTS

| | | | |
|---|---|---|---|
| 1,652,387 | 12/1927 | Barber | 220/493 |
| 2,756,912 | 7/1956 | Armstrong | 220/493 |
| 3,176,427 | 4/1965 | Hershey | 220/493 |
| 3,229,843 | 1/1966 | Billion | 220/493 |
| 3,272,376 | 9/1966 | Tieraney et al. | 220/493 |
| 5,211,191 | 5/1993 | Brown | 220/493 |

FOREIGN PATENT DOCUMENTS

| | | | |
|---|---|---|---|
| 785773 | 2/1935 | France | 220/493 |
| 315539 | 10/1956 | Switzerland | 220/493 |

Primary Examiner—Joseph M. Moy
Attorney, Agent, or Firm—Ronald E. Smith

[57] ABSTRACT

A utility container is formed of a light-in-weight, durable, flexible and resilient elastomeric material and is constructed in open mesh design so that it drains quickly and completely upon being lifted from a body of water and so that it refills quickly when reintroduced into the body of water. Accordingly, its use substantially lowers the amount of effort expended by a fisher in lifting and lowering the container when fishing from a bridge, relative to bucket-type containers. The elastomeric material is inherently buoyant so that the container floats without external flotation devices. In a preferred embodiment, the container has a cylindrical sidewall and a pair of opposed, circular end walls. A leading and a trailing end of the sidewall are disposed in overlapping relation to one another to form a normally closed access opening that is silently opened and closed upon insertion into and withdrawal of a hand into and from the container so that creatures in the container are not startled. The inherent resiliency of the material closes the access opening when the hand is withdrawn. The container has further utility as a temporary cage or carrying case for pets or inanimate objects.

7 Claims, 3 Drawing Sheets

UTILITY BASKET AND BAIT CONTAINER

BACKGROUND OF THE INVENTION

1. Field of the Invention

This invention relates, generally, to utility baskets in general, including bait containers of the type used by fishers. More particularly, it relates to containers of open mesh construction having utility for temporarily holding small animals, bait, or the like.

2. Description of the Prior Art

Many bait containers are of bucket-like construction. Thus, they are heavy because they hold water even when lifted from a body of water. Accordingly, when used from a bridge, the fisher must expend a considerable amount of energy and effort to lift the bucket from the water below to the location on the bridge where the fisher is standing. After a bait fish or other creature has been removed from the container, it must again be lowered, with the expenditure of further effort, to the body of water from the bridge.

This problem is solved in the prior art by providing bait containers of open mesh construction. Such containers drain when lifted from the water, and are thus easier to use, even from a high bridge, than the bucket-like containers. Since an open mesh bait container can be raised and lowered relatively quickly, the bait is not long exposed to air so it remains alive.

The known open mesh bait containers are of stainless steel construction, however, so that they do not rust. Thus, they are inherently heavy and can not float unless a flotation device is attached thereto. The use of expensive stainless steel and the provision of a flotation device further increases the cost of such containers.

Another drawback of the open mesh, stainless steel containers of the prior art is that they are provided with gate-like, i.e., hinge-like access doors. Thus, to retrieve a bait item, the fisher opens the door by swinging it on its hinges. This startles the bait fish or other bait creatures and they typically attempt to escape. This makes them harder to retrieve; sometimes they injure themselves and thus reduce their value as bait.

Thus, there is a need for a bait container that floats in the absence of auxiliary flotation devices, and there is a further need for a bait container having an access opening that may be opened by a fisher without startling the bait so that they may be retrieved easily by the fisher without injury.

However, in view of the art considered as a whole at the time the present invention was made, it was not obvious to those of ordinary skill in this art how the improved bait container should be constructed.

There is also a need in other industries for improved utility containers. For example, pet shops are often inconvenienced when cleaning an animal's cage because there is typically no convenient place to put the animal during the cage-cleaning process. The industry needs a safe, comfortable place to put the animals during such time. The needed temporary cage should be constructed so that the animal placed therein does not harm itself. It should also be constructed in such a way that the animal placed therein enjoys being in the container.

There is a further need for a container that may be used to transport pets to and from veterinarian's offices; the container should have the same qualities as the temporary cage needed by pet shops.

SUMMARY OF THE INVENTION

The longstanding but heretofore unfulfilled need for an apparatus that overcomes the limitations of the prior art is now met by a new, useful, and nonobvious invention.

The present invention includes a container having a main body of predetermined geometrical configuration. The main body, which is preferably formed of an elastomeric material such as a high impact polyethylene, includes a cylindrical sidewall and a pair of flat, opposed end walls positioned at opposite ends thereof so that an enclosure of a predetermined amount of space is collectively defined by the sidewall and the end walls. The sidewall has a leading end and a trailing end that are disposed in overlapping relation to one another.

The sidewall and the end walls are formed of an open mesh material that is inherently flexible and resilient so that the leading and trailing ends of the sidewall are disposed in said overlapping relation to one another when the container is in repose. Accordingly, the leading and trailing ends of the sidewall are momentarily separated from one another when a hand is inserted therebetween, such momentary separation providing an access opening for the retrieval of bait creatures, animals, or other objects from the container. The leading and trailing ends return to their overlapped configuration, thereby closing the access opening, when the hand is removed from the access opening; the returning is a function of the inherent resiliency of the elastomeric material.

The opening and closing of the access opening is therefore accomplished in silence and without jarring the container so that bait creatures or other sentient beings within the container are not startled upon the opening and closing of the access opening.

The flexibility and resiliency of the elastomeric material also prevents injury to bait creatures or other sentient beings housed therewithin if the creatures come into contact with the end walls or the sidewall of the container.

The container is well-ventilated so that it drains quickly and refills quickly upon being withdrawn from or immersed into a body of water. Its open mesh construction also prevents pets or other small animals, including birds, from feeling overly confined when positioned therewithin.

Moreover, the container is rust-proof, light-in-weight, and durable.

Preferably, the end walls are of circular configuration and the sidewall is of cylindrical configuration.

The elastomeric material is a buoyant material so that the container floats in water in the absence of auxiliary flotation devices attached thereto.

The inventive assembly further includes a tether line of predetermined extent for interconnecting the container and a fisher when the container is used in a body of water within which the fisher is wading; the tether line has a first end secured to a first end of the container and a second end releasably secured to a preselected article of clothing of the fisher.

Advantageously, instead of attaching the second end of the tether to the fisher, said second end may be releasably attached to a second end of the container to thereby convert the tether into a carrying handle for the container. A suitable cushioning means may be provided at the midpoint of the tether/handle to provide a hand grip to facilitate carrying of the container.

It is a primary object of this invention to provide a light-in-weight bait container that is easily lifted and lowered from a bridge.

Another object is to provide a bait container that has an access opening that enables a fisher to retrieve bait without startling the bait.

Still another object is to provide a bait container that floats in the absence of auxiliary flotation devices and which is made of inexpensive yet durable materials.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
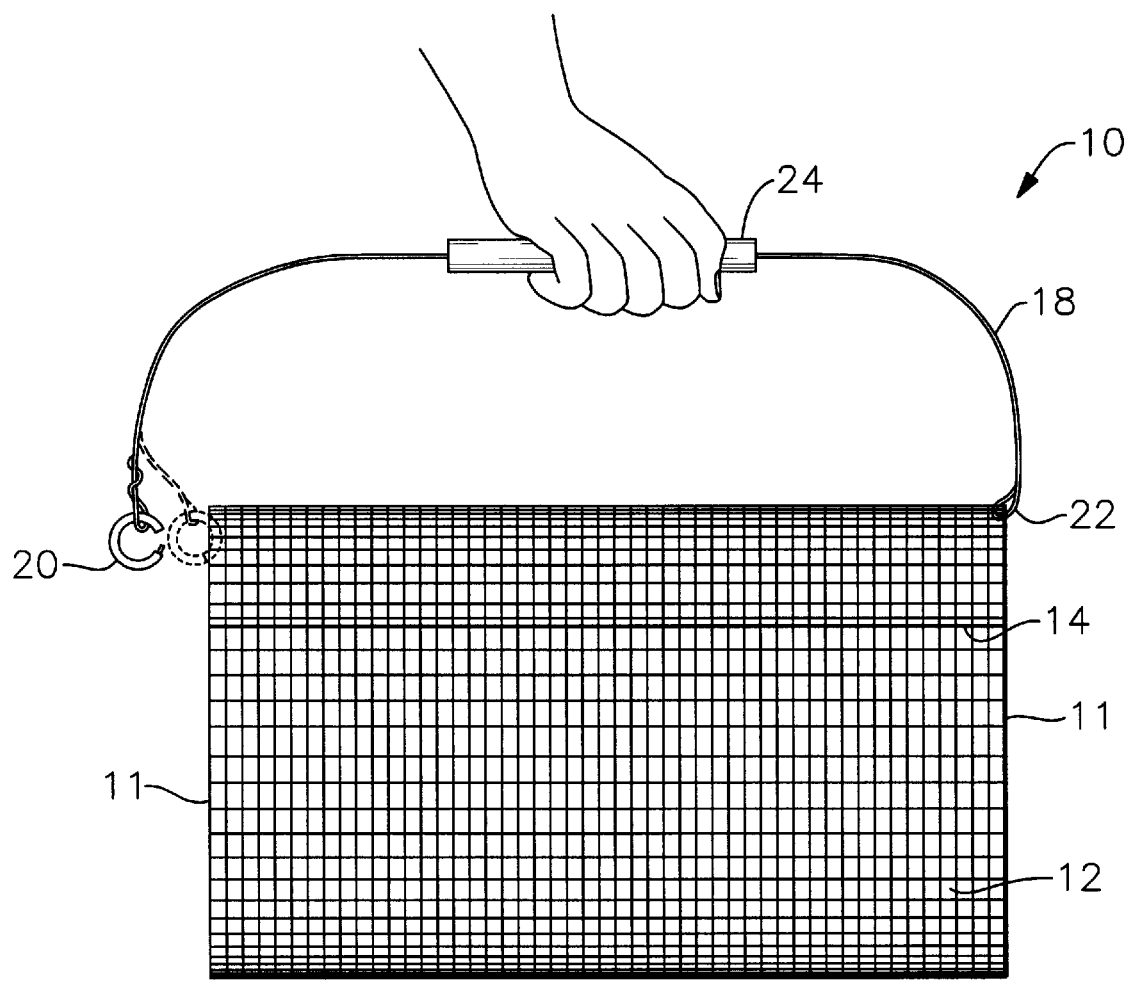
FIG. 1 is a side elevational view of a preferred embodiment of the novel utility container when in repose and when the tether line is configured to provide a handle means for the container to facilitate its carrying.

Referring now to FIG. 1, it will there be seen that an exemplary embodiment of the invention is denoted as a whole by the reference numeral 10.

Utility container 10, configured in FIG. 1 for carrying, is of cylindrical configuration and is made of an open mesh, elastomeric material such as high impact polyethylene or other suitable plastic material. In a preferred embodiment, it includes circular opposite ends, collectively denoted 11, that are attached by any suitable means to cylindrical sidewall 12.

Opposite ends 11 could be of any predetermined geometrical configuration, such as triangular, square, pentagonal, and the like, but such configuration would require a multifaceted sidewall and thus is not preferred.

The elastomeric material is less expensive than stainless steel yet is also not subject to corrosion in salt or fresh water. When the novel utility container is used as a bait container, the open mesh construction provides rapid draining of the container when it is lifted from a body of water and equally rapid re-filling thereof when reintroduced thereinto. Its inherent light weight makes it easy to lift onto and lower from high bridges.

Figure 2:
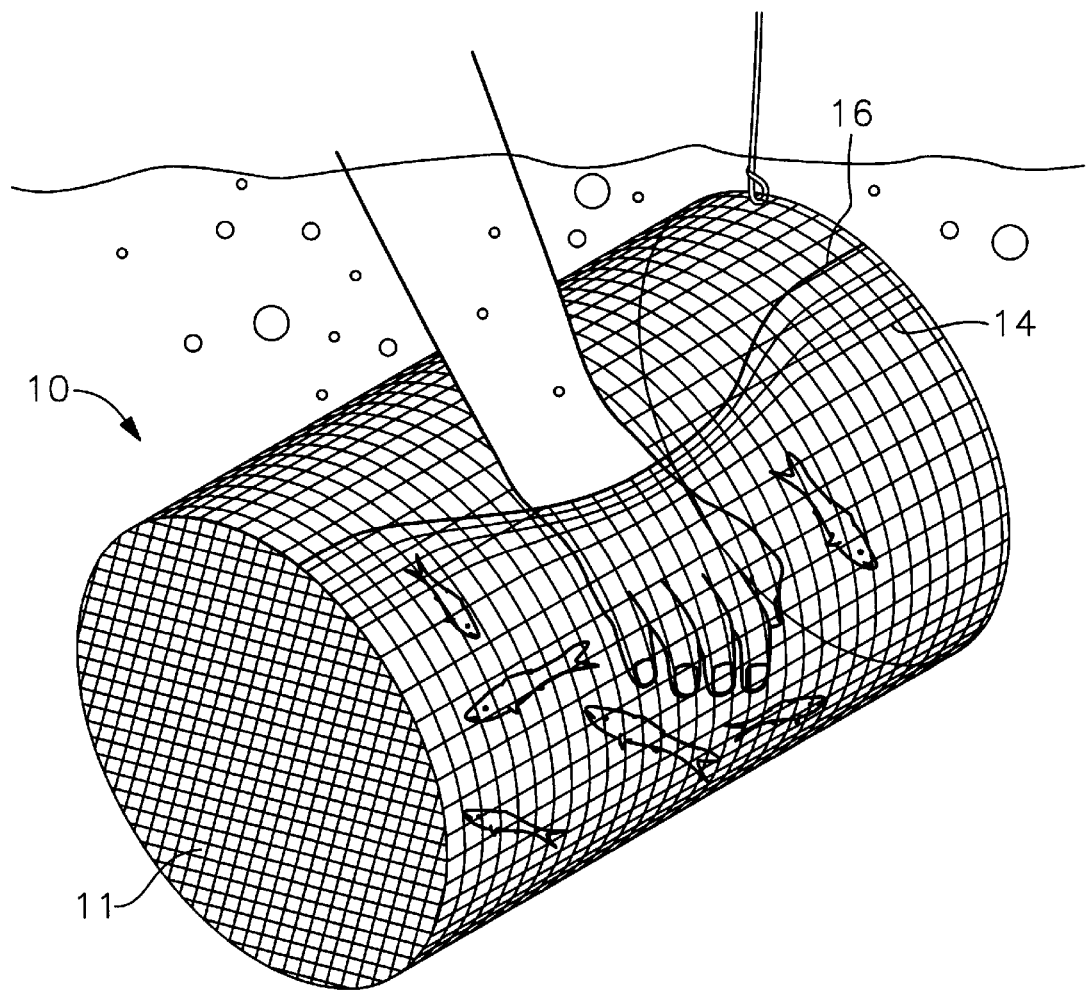
FIG. 2 is a perspective view when the utility container is being used as a bait container and when a fisher is inserting a hand into the novel access opening to retrieve a bait fish.

Significantly, and as best understood in connection with FIG. 2, cylindrical sidewall 12 of the novel container 10 has a first or leading end 14 and a second or trailing end 16 that overlies said leading end 14 when the container is assembled. In other words, an overlap is formed where leading end 14 underlies trailing end 16; the extent of the overlap is preselected and is preferably a few inches in extent. The overlap could also be formed by positioning leading end 14 into overlying relation to trailing end 16.

The elastomeric material from which novel bait container 10 is made is inherently flexible and resilient so that sidewall 12 maintains its cylindrical configuration when in repose. However, when a fisher inserts his or her hand between said leading and trailing ends, as depicted in FIG. 2, said leading and trailing ends separate from one another momentarily so that the fisher may retrieve a bait item. Upon grasping a bait item, the fisher easily slides his or her hand from the container and said leading and trailing ends return to their respective positions of repose, such as depicted in FIG. 3, thereby closing the access opening so that no bait creatures may escape from the bait container.

Significantly, both the opening and the closing of the access opening occur silently. The fisher can therefore introduce his or her hand into and out of the container without startling the bait. This makes the retrieving of bait much easier and more pleasant for both the fisher and the bait. This is especially true when bait is retrieved with the container still under water as depicted in FIG. 2.

Figure 3:
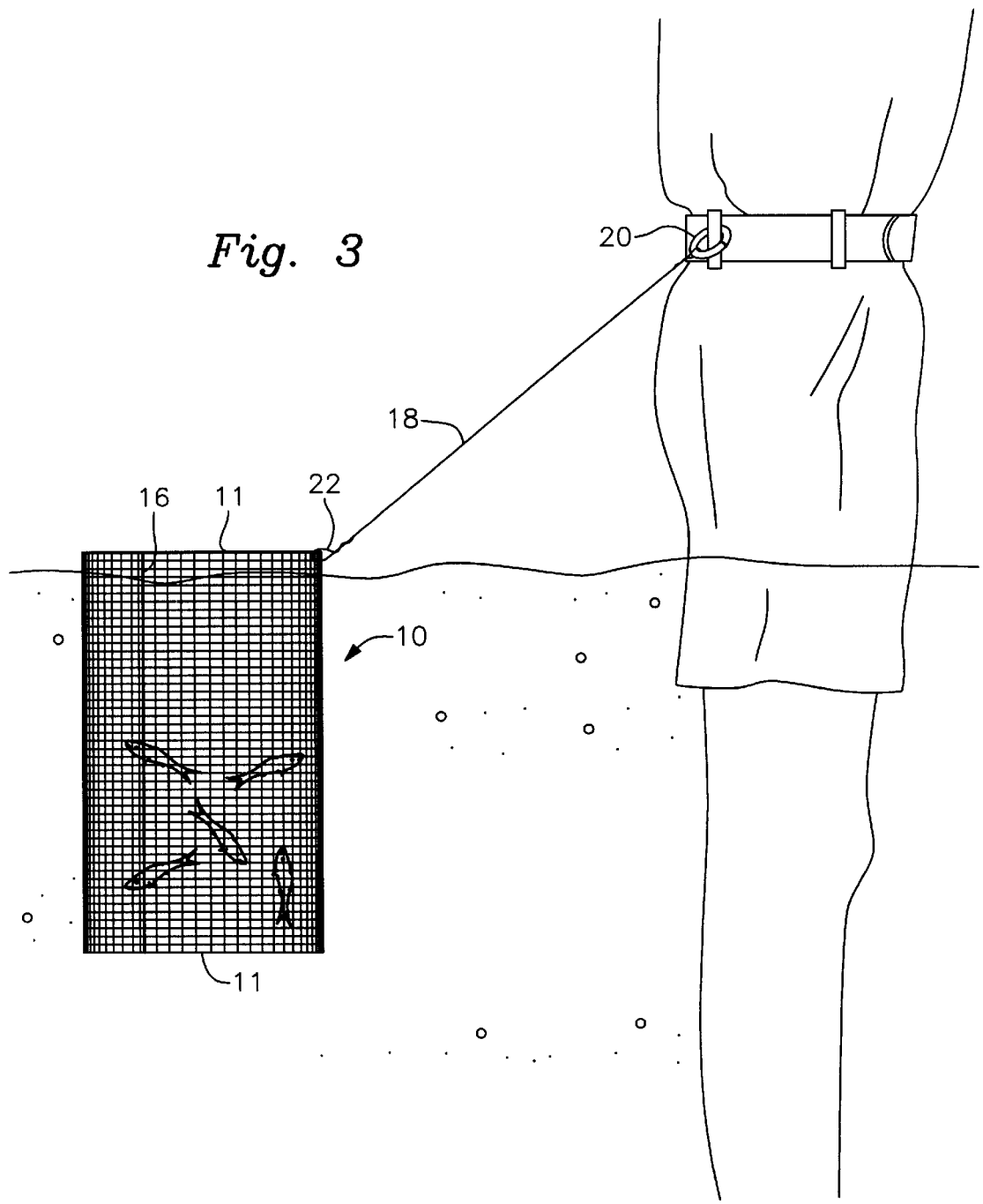
FIG. 3 is a side elevational view of the novel utility container when configured as a bait container tethered to a fisher who is wading in a body of water.

Note from FIG. 3 that novel container 10 floats in the water without need of auxiliary flotation devices. This is because the elastomeric material from which it is made is inherently buoyant. Thus, a tether line 18 and a clasp 20 (which may be in the form of a shower curtain ring) may be advantageously employed to interconnect container 10 to a belt loop or other suitable attachment point on the clothing of the fisher so that the container follows the fisher during his or her travels in the body of water. A proximal end 22 of tether 18 is preferably permanently attached to a preselected end of container 10.

In FIG. 1, tether 18 is reconfigured as a carrying means. Clasp 20 is releasably attached to an end of the container 10 opposite from the end thereof to which tether 18 is permanently attached, and a handle means 24 is provided to facilitate comfortable carrying of container 10. The FIG. 1 configuration is used primarily when transporting pets to and from veternarians' offices or the like.

Container 10, as mentioned earlier, has numerous uses beyond its bait container usage. For example, since it is well-ventilated and made of a flexible, resilient material, it may be used as a temporary housing for small mammals such as gerbils or hamsters while their cage is being cleaned or while they are being transported to a veterinarian, for example. Pet birds, snakes, and the like may also be temporarily lodged therewithin without injury and without oxygen deprivation. The substantially unrestricted field of view from within the container, due to its open mesh construction, relieves the anxiety of animals temporarily lodged therewithin. Pet shop owners have observed that small animals enjoy playing in the novel container.

The container also has utility for storing inanimate objects therewithin as well.

The light weight of novel container 10 also enables it to be shipped at very low cost.

Finally, when it is desired to use novel container 10 as a bait bucket, and to transport it with live bait therein from a bait shop to a fishing spot, for example, the container is simply placed inside a conventional imperforate bucket, not shown.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A container, comprising:

a main body of predetermined geometrical configuration, said main body including a sidewall and a pair of opposed end walls positioned at opposite ends thereof so that an enclosure of a predetermined amount of space is collectively defined by said sidewall and said end walls;

said sidewall having a leading end and a trailing end that are disposed in overlapping relation to one another;

said sidewall and said end walls being formed of an open mesh, elastomeric material;

said elastomeric material being inherently flexible and resilient so that said leading and trailing ends of said sidewall are disposed in said overlapping relation to one another when said container is in repose;

said leading and trailing ends being momentarily separated from one another when a hand is inserted therebetween, such momentary separation providing an access opening for the retrieval of items from said container;

said leading and trailing ends returning to said overlapped configuration, thereby closing said access opening, when said hand is removed therefrom, said returning being a function of the inherent resiliency of said elastomeric material;

whereby said opening and closing of said access opening is accomplished in silence so that items such as sentient beings within said container are not startled upon said opening and closing of said access opening;

whereby said elastomeric material is sufficiently flexible and resilient to prevent injury to sentient beings housed therewithin if said sentient beings come into contact with said end walls or sidewall;

whereby said container is well-ventilated so that it drains quickly and refills quickly upon being withdrawn from or immersed into a body of water; and whereby said container is rust-proof, light-in-weight, and durable.

2. The container of claim 1, wherein said end walls are of circular configuration and wherein said sidewall is of cylindrical configuration.

3. The container of claim 2, wherein said elastomeric material is a buoyant material so that said container floats in water in the absence of auxiliary flotation devices attached thereto.

4. The container of claim 3, wherein said elastomeric material is a high impact polyethylene.

5. The container of claim 1, further comprising a tether line of predetermined extent for interconnecting said container and a fisher when said container is used in a body of water within which the fisher is wading, said tether line having a first end secured to said container and a second end releasably secured to a preselected article of clothing of said fisher.

6. The container of claim 1, further comprising a tether line having a first end secured to a first end of said container and having a second end releasably secured to a second end of said container so that said tether line forms a carrying means to facilitate carrying of said container.

7. The container of claim 6, further comprising a handle means positioned at a midpoint of said carrying means.

* * * * *